Aug. 30, 1960     S. BENNON     2,950,698
ELECTRICAL STEERING CONTROL SYSTEM
Filed June 6, 1950
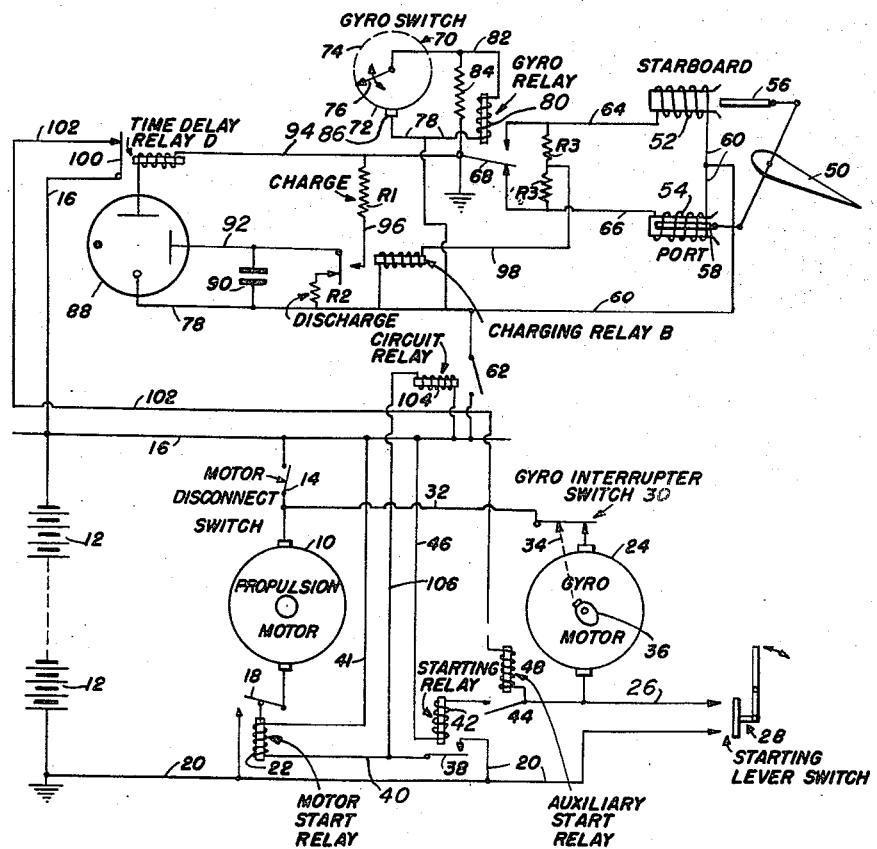
INVENTOR:
SAUL BENNON
BY
ATT'Y United States Patent Office 2,950,698
Patented Aug. 30, 1960

2,950,698

ELECTRICAL STEERING CONTROL SYSTEM

Saul Bennen, Sharon, Pa., assignor, by mesne assignments, to the United States of America as represented by the Secretary of the Navy Filed June 6, 1950, Ser. No. 166,507

9 Claims. (Cl. 114—23)

This invention relates to an electric steering control system for vessels, more particularly designated as an anti-circling run protector for a vessel, and more specifically described as a means to prevent a torpedo from returning to a submarine or any source from which it was sent.

In an electrically propelled torpedo, steering in the horizontal or vertical plane is controlled by impulses transmitted alternately or intermittently between a pair of electrical rudder operating devices. These devices cause the torpedo to be guided normally in a wavy path upon a course which for steering horizontally is maintained by a gyro operating mechanism. This intermittent operation generally results in a straight mean course, and the operation of the anti-circular run device is based upon the fact that the steering rudder must be held to one side for a definite time interval to cause the torpedo to turn through a circle or a portion of a circle.

An important object of the invention is to provide means for preventing a circular run of a vessel for more than a predetermined duration.

A further object of the invention is to provide means for automatically opening the torpedo propelling motor circuit or the steering circuits, or both.

A still further object of the invention is to provide a time delay circuit which is operative to disable the torpedo and to render it harmless.

Still a further object of the invention is to parallel either channel of a pair of rudder operating circuits with the same time delay circuit which if energized for more than a definite time interval will act to render the torpedo harmless.

A definite object of the invention is to provide a gas electronic tube whose operation is controlled by the charging rate of a resistance-capacitance network to provide a time delay operation of the tube and a circuit or circuits controlled thereby.

Other objects of the invention will appear in the specification and will be apparent from a study of the accompanying drawing, which is a diagrammatic representation of the circuits, devices and connections in a control system for an anti-circling protector for submarine torpedoes, in accordance with this invention.

The operation of this anti-circular run device is based upon the fact that the steering rudder must be held at one side for a definite time interval to cause the torpedo to turn in a circle or a portion of a circle. The torpedo may be rendered harmless after it has gone a definite distance by providing a time delay circuit to open the motor circuit, the steering circuits, or both of them, by relay action.

Referring now more particularly to the drawing, a propulsion motor 10 for the torpedo is connected to a battery 12, or another source of power, through a motor disconnect switch 14 and a battery main 16 from one terminal, and through a motor start switch 18 to a battery main 20 from the other terminal. The switch 14 may be manually opened and closed and the switch 18 has a motor start relay 22 with a delayed closing winding.

A gyro motor 24 has a conductor 26 from one terminal connected by a starting lever switch 28 to one battery main 20, and a gyro interrupter switch 30 connecting the other motor terminal to a conductor 32, the other end of which is connected to the motor end of the motor disconnect switch 14 so that the opening of that switch will also open the connection to the gyro motor 24. The gyro motor circuit is also opened by the interrupter switch 30 a short time after it is started as represented by an arm 34 engaging the switch and operated by a cam 36 on the gyro motor shaft. After a running time of the order of one-third of a second, the motor brings the gyro wheel up to 12,000 r.p.m., disconnects the motor from the gyro wheel which continues to spin freely, and opens the gyro interrupter switch 30 through the arm 34-cam 36 connection.

A starting relay has a switch 38 for connecting a conductor 40 from one end of the motor start relay 22 winding, through the switch to the battery main 20, and the other end of the winding is connected by a conductor 41 with the other battery main 16. The starting relay has a winding 42 connected through an auxiliary starting relay switch 44 with the conductor 26 which extends to the starting lever switch 28, and through it to the battery main 20. The other end of the winding 42 is connected by a conductor 46 with the battery main 16. This requires that an auxiliary starting relay winding 48 must be energized before the starting relay can receive current, and the delayed action motor start relay 22 in turn depends upon the energization of the starting relay. The auxiliary starting relay circuit is normally closed but may be opened by the anti-circular run device as hereafter set forth.

The result of these starting details is that the gyro motor is quickly started and attains high speed as soon as the starting lever switch 28 is closed, and the motor is disconnected before a starting circuit is closed to the propulsion motor 10 which is subject to the delay relay 22. This prevents an operating strain on the battery, avoiding the connection of both motors at the same time.

A steering rudder 50 is represented as operated in opposite directions from a central position by solenoid windings 52 and 54 for starboard and port steering, by corresponding cores 56 and 58 connected to the rudder. These windings have a common conductor 60 for connecting them through a circuit relay switch 62 to the battery main 16. The other ends of the windings are connected by conductors 64 and 66 with terminals to engage a gyro relay switch 68 in its closed and released positions respectively. This switch is connected to the other battery main 20 as represented by a ground. When the gyro relay is energized, starboard rudder results and when it is not energized, port rudder operation is effected through the respective winding 52 or 54 and switch 68.

The gyro relay is alternately operated and released in the normal action of steering the torpedo, causing it to swerve slightly from one side to the other of the direct path. A gyro switch 70 is represented as having a contact ring comprising a conducting section 72 and a nonconducting section 74, which is relatively fixed but adjustable for angle shots of the torpedo. Movable upon the ring is a contact 76 connected at the center of the ring to the outer gyro gimbal and movable with it relative to the ring. The junction of the two ring sections is the switching point and the contact 76 hunts on this line as the torpedo swerves from side to side of its predetermined gyro course. When the contact 76 bears on the insulated section 74, the gyro relay is energized and starboard rudder is obtained; and when it engages the conducting section 72, the gyro relay is released and port rudder is the result.

When the torpedo goes off course to port, the contact 76 is moved by the gyro gimbal to engage the non-conducting section 74 of the ring and a circuit is closed from the battery main 16 through the circuit relay switch 62, conductor 78, winding 80 of the gyro relay, conductor 82 and resistance 84 to ground, thus operating the gyro relay switch 68 and causing starboard rudder. When the torpedo goes off course to starboard, the contact 76 is moved by the gyro gimbal to engage the conducting section 72 of the ring and gyro relay winding is short circuited by the conductor 82 which leads to the movable contact 76, and thence through the conducting section 72, a contact 86 in engagement with the ring section 72 and the conductor 78 back to the other end of the gyro relay winding. A connection is thus closed through the resistance 84 to ground, but the relay winding is short circuited, releasing the switch 68 which causes port rudder.

To this basic system of intermittent electrical torpedo control and operation, a protector for preventing a detrimental circling run is applied by paralleling the solenoid windings for steering with a time delay circuit which if energized for more than a definite time interval will operate to render the torpedo harmless.

An electronic time delay system which may be used for this purpose comprises a cold cathode gas tube 88 having a condenser 90 with its terminals connected by conductors 78 and 92 with the cathode and grid of the tube. The conductor 78 is connected through the circuit relay switch 62 to the battery main 16, and the tube plate is connected through the winding of a time delay relay D and a conductor 94, the gyro relay switch 68 and to ground representing the other battery main.

A charging relay B has a switch 96 connected to the grid conductor 92 and adapted to make a connection when the relay is energized with one terminal of a charging resistor R1, the other terminal of which is connected to the conductor 94, and to make a release connection with one terminal of a discharge resistor R2, the other terminal of which is connected to the cathode supply conductor 78. One terminal of the charging relay winding is connected to the supply conductor 78 and the other terminal of the winding is connected by a conductor 98 with a mid-point between two bridging resistors R3, the other terminals of the resistors being separately connected to the conductor 64 from the starboard steering solenoid winding 52 and to the conductor 66 from the port steering solenoid winding 54.

The values of the charging resistor R1 and the condenser 90 may be selected or varied to obtain the proper time interval; the discharge resistor R2 may be low as compared to R1, and the resistance of each of the two bridging resistors R3 is large compared to that of the solenoid windings 52 and 54 but low enough to allow the charging relay B to operate. The charging relay B is energized when either one of the starboard or port channels is energized, through one of the bridging resistors R3 and through the switch 68 to ground, and during this time the condenser 90 is charged through the charging resistor R1. At the time of transfer of the gyro relay switch 68 from one channel to the other, the charging relay B is released momentarily and the condenser is discharged through the discharging resistor R2. The relay B must be fast enough to follow each operation of the gyro relay switch 68.

If the relay switch 68 keeps operating intermittently, the condenser will never become enough charged to fire and operate the gas tube 88, but if for any reason one of the steering channels remains energized continuously, the condenser, after a definite interval, will become charged sufficiently to breakdown the gas tube, and to energize the time delay relay D. This relay has a switch 100 connected to the battery main 16 and normally closing a circuit through a conductor 102 to the auxiliary start relay winding 48, and thence to the conductor 26 and through the starting lever switch 28 to the other main 20. Opening of this circuit by the switch 100, opens the auxiliary relay switch circuit and its switch 44 operates to open the starting relay 42 circuit which in turn opens its switch 38 in the motor start relay winding 22 circuit. This opens the motor switch 18 which cuts off the motor supply and stops the propulsion motor 10.

Opening of the motor start relay circuit may also open the circuit relay switch 62 which has a winding 104 connected at one end to the battery main 16 and connected by a conductor 106 with the conductor 40 which is connected through the starting relay switch 38 with the other battery main 20. This opens the battery main connection to the supply conductor 78 by which the steering solenoids and the current supply connections are made to the anti-circular run system. This same principle may be applied to a complete torpedo run or only to a portion of it, if desired; and it may be used in conjunction with hydrophones in an electrical acoustic control system.

In operation the starting lever switch 28 is closed manually or by the discharging of the torpedo, which closes a circuit to the gyro motor 24. The gyro motor quickly attains high speed and the motor circuit is cut by the gyro interrupter switch 34 which continues the gyro in operation for the remainder of the torpedo run. A circuit is also closed through the auxiliary start relay switch 44, and starting relay winding 42 to close its switch 38 in the motor start relay 22 circuit. A circuit is closed through the propulsion motor 10 which is delayed by the motor start relay until the gyro motor has been operated and cut-off, so that both motors will not be drawing current from the battery 12 at the same time.

As soon as the motor start relay is energized, the gyro switch and relay and the steering windings 52 and 54 will receive current through the energization of the circuit relay winding 104, and the torpedo will be maintained normally upon its predetermined course by the alternations of the rudder mechanism. The switch 100 of the time delay relay D is normally released and closed which completes the circuit through the auxiliary start relay winding 48.

During normal operation of the torpedo, the anti-circular run system does not come into modifying action, but the condenser 90 is charged and discharged at each operation of the gyro relay switch 68, either energized or released, through the operation of the charging relay B. If the relay B remains energized for a predetermined period, it indicates that one steering winding has been energized for too long a time without alternation of the rudder, or that some other part of the system is out of order, which might cause the torpedo to travel in a circular path and even in a circle, tending to turn it back toward the submarine or other vessel which fired it. This causes the time delay tube 88 to be charged by the condenser 90 which will energize the relay D and operate the switch 100. The circuit including the switch 100 may be connected in circuit with the auxiliary starting relay as shown, or in circuit with the circuit relay winding 104, or otherwise connected for safety operation as desired.

With this system arrangement, the solenoid steering channels are independently paralleled by a separate time delay device comprising a time delay electronic tube connected in circuit with a condenser which is normally charged and discharged at each operation of each steering channel. If one channel is continuously operated for a time sufficient to guide the torpedo in a semi-circle, or in any predetermined arc, the condenser will be charged sufficiently to fire the tube and to operate the time delay relay D to open a controlling circuit which will open the motor controlling relay circuit or the supply circuit for the steering channels and the anti-circular run system, and to stop the propulsion motor.

While a complete and operative arrangement for an anti-circular run system has been described in some detail, it should be regarded as an illustration or example and not as a restriction or limitation of the invention, as many changes in the construction, combination and arrangement of the system and its parts may be made without departing from the spirit and scope of the invention.

I claim:

1. In an electrical steering control system for vessels, a propulsion motor, a rudder and two electrical devices for turning it oppositely for steering, means for alternately operating the devices in guiding the vessel upon a predetermined course, anti-circular run means comprising an electronic tube and a condenser in circuit for activating the tube, means in connection with each electrical device for charging the condenser when the devices are operated and discharging the condenser when they are alternately operated, the tube being operatively activated when one device is continuously operated for a predetermined period of time, and circuit control means operated by the tube, when it is operatively actuated, to stop said propulsion motor.

2. In an electrical steering control system for vessels, a propulsion motor and a controlling circuit therefor, a rudder and two electrical devices for turning it oppositely for steering, means for alternately operating the devices in guiding the vessel upon a predetermined course, the vessel having an effective turning radius which requires a known time for a portion of its circular path, and anti-circular run means actuated by one of said devices when it is continuously operated for a predetermined time and including means in the motor controlling circuit to stop the motor.

3. In an electrical steering control system for submarine torpedoes, a propulsion motor and a controlling circuit therefor, a rudder and two electrical devices for turning it oppositely for steering, means for alternately operating the devices in guiding the torpedo upon a predetermined course, the torpedo having a turning radius which requires a known time for movement in a predetermined portion of its circular path when propelled by the motor, and anti-circular run means comprising an electronic timing device actuated with one of said devices when it is continuously operated for a predetermined time and including means operated by the timing device and located in the motor controlling circuit to stop the motor.

4. In an anti-circling protector for an electric torpedo, a propulsion motor and an operating circuit therefor, a rudder and two electrical devices for turning it oppositely for steering, means for alternately operating the devices in guiding the torpedo upon a predetermined course, the torpedo requiring a known time for traversing a predetermined portion of a circular path when propelled by the motor, anti-circular run timing means actuated by one of said devices when it is continuously operated for a predetermined time, and means in the motor operating circuit operated when the timing means is actuated to stop the motor.

5. In an anti-circling protector for an electric torpedo, a propulsion motor and an operating circuit therefor, a rudder and two electrical devices for turning it oppositely for steering, means for alternately operating the devices in guiding the torpedo upon a predetermined course, the torpedo requiring a known time for traversing a predetermined portion of a circular path when propelled by the motor, anti-circular run timing means comprising an electronic tube and a condenser in circuit therewith for activating the tube, means connected in parallel with each said electrical device for partially charging the condenser when each device is operated and discharging the condenser when the devices are alternately operated, the tube being activated by the condenser when one device is continuously operated, and electrical means operated by the tube when it is activated to open the motor circuit and stop the motor.

6. In an anti-circling protector for an electric torpedo, a propulsion motor and an operating circuit therefor, a rudder and two electrical devices for turning it oppositely for steering, means for alternately operating the devices in guiding the torpedo upon a predetermined course, the torpedo requiring a known time for traversing a predetermined portion of a circular path when propelled by the motor, anti-circular run timing means comprising an electronic tube and a condenser in circuit therewith, a charging resistor for the condenser and tube, a discharge resistor for the condenser, means connected with each said device and having a switch to close a circuit including the charging resistor to charge the condenser when the devices are operated and to close a circuit including the discharge resistor and the condenser when the devices are alternately operated, the tube being activatetd when one device is continuously operated, and electrical means operated by the tube when it is activated to control the motor operating circuit.

7. In an anti-circling protector for an electric torpedo, a propulsion motor and a controlling circuit therefor, a rudder and two electrical devices for turning it oppositely for steering, means for alternately operating the devices in guiding the torpedo upon a predetermined course, an electronic tube having a relay switch operated thereby and connected in the motor controlling circuit, a condenser for activating the tube to operate the relay, a charging resistor and a discharging resistor for the condenser, relay switch means to connect one resistor or the other in circuit with the condenser and the relay winding connected with a resistance in a parallel circuit either with one electrical device or the other, the discharge resistor being connected in circuit with the condenser between the connections of the winding with the alternate devices, and the charging resistor being connected with the tube to activate it when one of the electrical devices is continuously energized to hold the rudder in a fixed position to turn the torpedo out of its predetermined course.

8. In an anti-circling protector for an electric torpedo, a propulsion motor and a controlling circuit therefor, a rudder and two electrical devices for turning it oppositely for steering, means for alternately operating the devices in guiding the torpedo upon a predetermined course, anti-circular run means comprising an electronic tube and a condenser in circuit therewith, a charging resistor and a discharging resistor for the condenser, a switch for connecting either resistor to the condenser, a relay winding for the switch having resistances to connect it in a parallel circuit with either of the two electrical devices; a circuit relay having a switch for connecting the anti-circular run means, the two electrical rudder devices and the means for alternately operating the devices in an operating circuit with the propulsion motor, and having a winding for the relay in a circuit with the controlling circuit for the motor; and the electronic tube having a relay switch with a winding in circuit with the tube and energized when the tube is activated, and a switch in circuit with the controlling circuit for the motor, the tube beng activated when one electrical device is continuously energized to hold the rudder in a position to turn the torpedo out of its course into a circular path and the tube relay switch being operated to open the motor controlling circuit to stop the motor and to open the circuit relay winding circuit to open the switch for the said operating circuit.

9. In an azimuth steering control system for torpedoes, propulsion means, propulsion control means, a rudder, means for turning said rudder either to port or to starboard for steering said torpedo, means for controlling said means for turning said rudder to guide said torpedo upon a predetermined course, and timing means for measuring the period of time the torpedo is continuously steered either to port or to starboard, said timing means being operative after a predetermined period of continuous steering to either port or starboard to cause said propulsion control means to stop said propulsion means.

References Cited in the file of this patent

UNITED STATES PATENTS

| | | |
|---|---|---|
| 1,296,328 | Shonnard | Mar. 4, 1919 |
| 1,598,107 | Trenor | Aug. 31, 1926 |
| 1,772,348 | Hammond | Aug. 5, 1930 |
| 2,500,956 | Mershon | Mar. 21, 1950 |
| 2,525,334 | Baker | Oct. 10, 1950 |
| 2,546,555 | Meredith et al. | Mar. 27, 1951 |
| 2,568,719 | Curry | Sept. 25, 1951 |
| 2,595,868 | Milsom | May 6, 1952 |